(12) United States Patent
Blanchet et al.

(10) Patent No.: US 10,287,695 B2
(45) Date of Patent: May 14, 2019

(54) FLOW STRUCTURES FOR USE WITH AN ELECTROCHEMICAL CELL

(71) Applicants: Scott Blanchet, Chelmsford, MA (US); Roger Van Boeyen, Westford, MA (US)

(72) Inventors: Scott Blanchet, Chelmsford, MA (US); Roger Van Boeyen, Westford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 697 days.

(21) Appl. No.: 13/916,212

(22) Filed: Jun. 12, 2013

(65) Prior Publication Data

US 2013/0337366 A1    Dec. 19, 2013

Related U.S. Application Data

(60) Provisional application No. 61/817,682, filed on Apr. 30, 2013, provisional application No. 61/659,302, filed on Jun. 13, 2012.

(51) Int. Cl.
  *H01M 8/10*    (2016.01)
  *H01M 8/02*    (2016.01)
  (Continued)

(52) U.S. Cl.
  CPC .............. *C25B 15/08* (2013.01); *H01M 4/80* (2013.01); *H01M 4/808* (2013.01); *H01M 4/861* (2013.01);
  (Continued)

(58) Field of Classification Search
  CPC ... C25B 15/08; H01M 8/0232; H01M 8/0245; H01M 4/80; H01M 4/808; H01M 4/861
  See application file for complete search history.

(56) References Cited

U.S. PATENT DOCUMENTS 3,759,709 A * 9/1973 Asbury .................... B22F 3/11
                                                                  419/2
4,476,002 A * 10/1984 Howard .................. C25B 11/00
                                                                204/283
(Continued)

FOREIGN PATENT DOCUMENTS

EP          1403954 A2      3/2004
JP          S62-227097      10/1987
(Continued)

OTHER PUBLICATIONS

Search Report and Written Opinion for International Application No. PCT/US2013/045474 dated Sep. 19, 2013, 9 pages.

(Continued)

*Primary Examiner* — Jonathan G Jelsma
(74) *Attorney, Agent, or Firm* — Finnegan, Henderson, Farabow, Garrett & Dunner, LLP

(57) ABSTRACT

The design and method of fabrication of a three-dimensional, porous flow structure for use in a high differential pressure electrochemical cell is described. The flow structure is formed by compacting a highly porous metallic substrate and laminating at least one micro-porous material layer onto the compacted substrate. The flow structure provides void volume greater than about 55% and yield strength greater than about 12,000 psi. In one embodiment, the flow structure comprises a porosity gradient towards the electrolyte membrane, which helps in redistributing mechanical load from the electrolyte membrane throughout the structural elements of the open, porous flow structure, while simultaneously maintaining sufficient fluid permeability and electrical conductivity through the flow structure.

14 Claims, 10 Drawing Sheets

(51) Int. Cl.
   *C25B 15/08*   (2006.01)
   *H01M 8/0232*  (2016.01)
   *H01M 8/04082* (2016.01)
   *H01M 4/80*    (2006.01)
   *H01M 4/86*    (2006.01)
   *H01M 8/0245*  (2016.01)

(52) U.S. Cl.
   CPC ....... *H01M 8/0232* (2013.01); *H01M 8/0245* (2013.01); *H01M 8/04201* (2013.01); *Y02E 60/50* (2013.01); *Y10T 156/1002* (2015.01)

(56) References Cited

U.S. PATENT DOCUMENTS

| | | | |
|---|---|---|---|
| 5,151,334 A * | 9/1992 | Fushimi | C23C 14/06 429/465 |
| 2004/0033410 A1* | 2/2004 | Brady et al. | 429/34 |
| 2004/0058228 A1 | 3/2004 | Shibata et al. | |
| 2006/0134501 A1* | 6/2006 | Lee | H01M 8/0204 429/457 |
| 2007/0264152 A1* | 11/2007 | Zhao | B22F 3/1134 420/591 |
| 2009/0099015 A1 | 4/2009 | Yoshizawa | |
| 2009/0297921 A1* | 12/2009 | Watanabe | H01M 8/0206 429/413 |
| 2010/0040926 A1* | 2/2010 | Blanchet et al. | 429/30 |
| 2011/0003235 A1* | 1/2011 | Hwang | H01M 8/12 429/495 |
| 2011/0081591 A1* | 4/2011 | Scherer et al. | 429/457 |
| 2011/0143254 A1 | 6/2011 | Kongkanand et al. | |
| 2011/0195332 A1* | 8/2011 | Goebel | 429/465 |
| 2011/0287340 A1 | 11/2011 | Mougin et al. | |
| 2012/0094210 A1 | 4/2012 | Uensal et al. | |
| 2013/0224625 A1* | 8/2013 | Sumioka | C04B 35/83 429/482 |
| 2015/0311491 A1* | 10/2015 | Deschamps | H01M 2/1653 429/152 |

FOREIGN PATENT DOCUMENTS

| | | | | |
|---|---|---|---|---|
| JP | H09-177803 | | 7/1997 | |
| JP | 2003-138391 A | | 5/2003 | |
| JP | 2003-226992 A | | 8/2003 | |
| JP | 2004-119108 | | 4/2004 | |
| JP | 2009-101351 A | | 5/2009 | |
| JP | 2010-095738 A | | 4/2010 | |
| JP | 2010-103075 A | | 5/2010 | |
| JP | 4876363 B2 | | 2/2012 | |
| JP | 2012-508320 | | 4/2012 | |
| JP | WO 2012060258 A1 * | 5/2012 | ............ C04B 35/83 |
| WO | WO-2011148100 A1 * | 12/2011 | .......... H01M 2/1653 |

OTHER PUBLICATIONS

Information Statement filed by a 3$^{rd}$ party with the Japanese Patent Office for Japanese Patent Application No. JP 2015-517399, filed on Sep. 21, 2016, 30 pages.
Notification of Reasons for Rejection issued in Japanese Patent Application No. 2015-517399 dated May 15, 2017, 6 pages.
First Office Action issued in Chinese Patent Application No. 201380042780.X dated Jun. 3, 2016.
Second Office Action issued in Chinese Patent Application No. 201380042780.X dated Nov. 16, 2016.
Third Office Action issued in Chinese Patent Application No. 201380042780.X dated Jul. 11, 2017.
Intention to Grant issued in European Application No. 13 731 227.8 dated May 8, 2018, 36 pages.
Examination Report issued in European Patent Application No. 13731227.8 dated Oct. 5, 2017, (3 pages).
Notification of Reasons for Rejection issued in Japanese Patent Application No. 2015-517399 dated Oct. 26, 2017, (5 pages).
Decision of Rejection cited in Japanese Patent Application No. 2015-517399, dated Dec. 18, 2018, with English Translation (6 pages).
First Examination Report cited in Indian Patent Application No. 8889/CHENP/2014, dated Feb. 6, 2019 (7 pages).

* cited by examiner

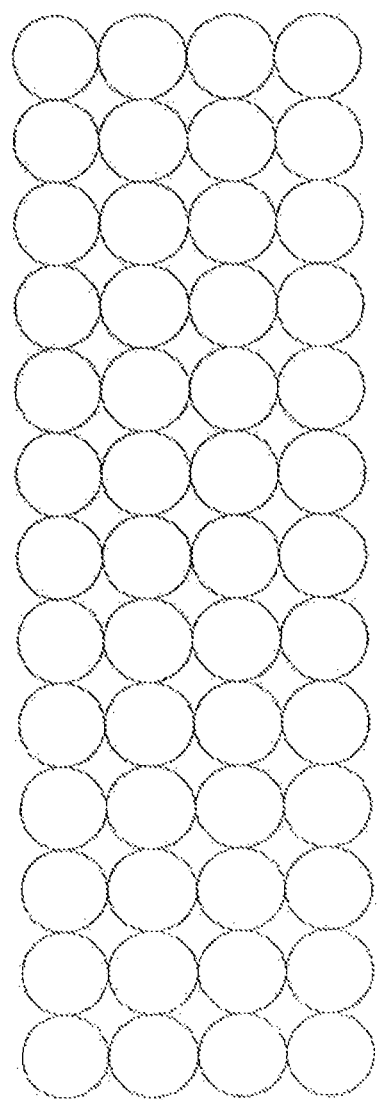
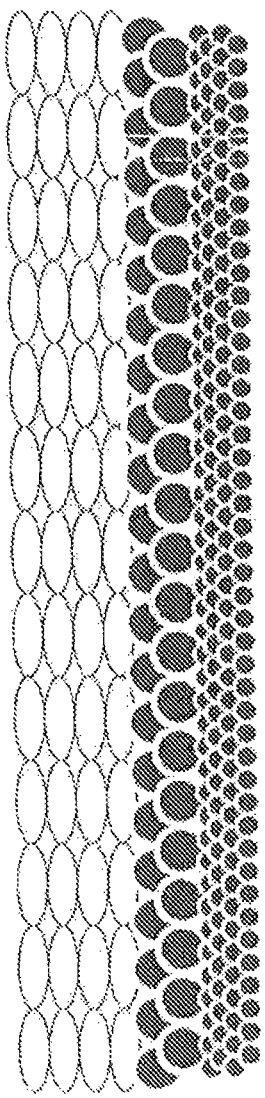
FIG. 5A
FIG. 5B

FLOW STRUCTURES FOR USE WITH AN ELECTROCHEMICAL CELL

This application claims priority to U.S. Provisional Application No. 61/659,302, filed Jun. 13, 2012, and U.S. Provisional Application No. 61/817,682, filed Apr. 30, 2013, which are incorporated herein by reference in their entirety.

The present disclosure is directed towards electrochemical cells, and more specifically, the design and method of fabrication of flow structures for use in high differential pressure electrochemical cells.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a positively charged anode, a negatively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons flow through the circuit to the cathode and generates electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" depends largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack. The fuel cells are stacked together sequentially, each cell including a cathode, a electrolyte membrane, and an anode. Each cathode/membrane/anode assembly constitutes a "membrane electrode assembly", or "MEA", which is typically supported on both sides by bipolar plates. Gases (hydrogen and air) are supplied to the electrodes of the MEA through channels formed in the plates, which are known as flow fields. In addition to providing mechanical support, the bipolar plates (also known as flow field plates) physically separate individual cells in a stack while electrically connecting them.

FIG. 1 is an exploded schematic view showing the various components of a prior art PEM fuel cell 10. As illustrated, bipolar plates 2 flank the "membrane electrode assembly" (MEA), which comprises an anode 7A, a cathode 7C, and an electrolyte membrane 8. Hydrogen atoms supplied to anode 7A are electrochemically split into electrons and protons (hydrogen ions). The electrons flow through an electric circuit to cathode 7C and generate electricity in the process, while the protons move through electrolyte membrane 8 to cathode 7C. At the cathode, protons combine with electrons and oxygen (supplied to the cathode) to produce water and heat.

Additionally, prior art PEM fuel cell 10 comprises electrically-conductive gas diffusion layers (GDLs) 5 within the cell on each side of the MEA. GDLs 5 serve as diffusion media enabling the transport of gases and liquids within the cell, provide electrical conduction between bipolar plates 2 and electrolyte membrane 8, aid in the removal of heat and process water from the cell, and in some cases, provide mechanical support to electrolyte membrane 8. GDLs 5 can comprise a woven or non-woven carbon cloth with electrodes 7A and 7C located on the sides facing the electrolyte membrane. In some cases, the electrodes 7A and 7C include an electrocatalyst material coated onto either the adjacent GDL 5 or the electrolyte membrane 8. Generally, carbon-fiber based GDLs do not meet the performance requirements of a high-differential pressure cell, particularly because of the difficulty in controlling the pore parameters. Therefore, some high-pressure electrochemical cells, for example, electrochemical hydrogen compressors, purifiers, etc., use "frit"-type densely sintered metals, screen packs, or expanded metals to create GDL 5 in order to have better control over pore parameters. However, the "frit"-type media frequently result in low void fractions, high gas flow resistance, and become easily flooded with water during operation. Layered structures (i.e., screen packs and expanded metals) result in relatively thick gas diffusion layers suitable for high differential pressure operations. However, they also introduce other performance penalties, for example, high contact resistance, high current density regions which make it difficult to cool the stack, etc. The physical limitations of conventional GDL structures limit the applicability of electrochemical cells in procedures requiring high differential pressures. This has created a continuing need to improve the design, durability, and efficiency of electrochemical cells.

The present disclosure is directed towards the design and fabrication of flow fields and gas diffusion layers for use with electrochemical cells. In particular, the present disclosure is directed towards the design and method of fabrication of three-dimensional, porous flow structures for use with electrochemical cells. Such devices may be used in electrochemical cells operating under high differential pressures, including, but not limited to, fuel cells, electrolysis cells, hydrogen purifiers, hydrogen expanders, and hydrogen compressors.

A first aspect of the present disclosure is a method of fabricating an open, porous flow structure for use in an electrochemical cell. The method comprises the steps of selecting a porous metallic material having greater than about 70% void volume, compacting the porous metallic material using at least one mechanical technique, and laminating at least one micro-porous material layer on one side of the porous metallic material. The at least one micro-porous material layer is selected to have an average pore size smaller than an average pore size of the compacted porous metallic material.

Another aspect of the present disclosure is a flow structure for use in an electrochemical cell. The flow structure comprises a compacted porous metallic substrate and at least one micro-porous material layer laminated on one side of the compacted porous metallic substrate, wherein an average pore size of the at least one micro-porous material layer is smaller than an average pore size of the compacted porous metallic substrate Yet another aspect of the present disclosure is an electrochemical cell for use in high-differential pressure operations. The electrochemical cell comprises a first electrode, a second electrode, and a proton exchange membrane disposed therebetween. The cell further includes a first and a second flow structure, wherein the first flow structure comprises a first compacted porous metallic substrate in fluid and electrical communication with the first electrode and the membrane, and the second flow structure comprises a second compacted porous metallic substrate in fluid and electrical communication with the second electrode and the membrane.

The accompanying drawings, which are incorporated in and constitute a part of this specification, illustrate embodiments of the invention and together with the description, serve to explain the principles of the various aspects of the invention.

FIG. 5A illustrates an uncompacted porous metallic material, in accordance with exemplary embodiments of the present disclosure;

FIG. 5B illustrates a porous metallic material after compaction and lamination with a micro-porous material layer, in accordance with exemplary embodiments of the present disclosure;

Figure 1:
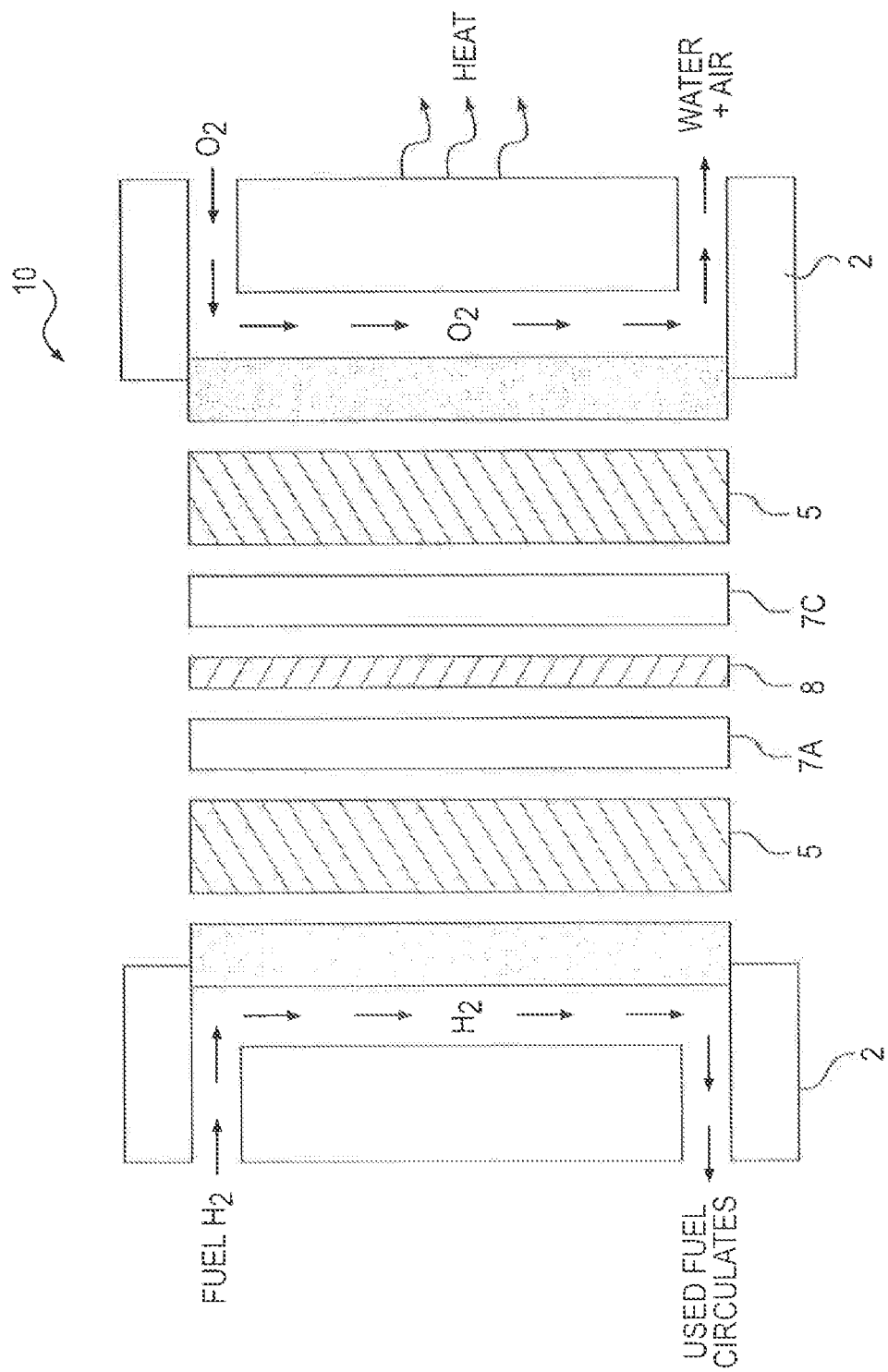
FIG. 1 illustrates an exploded schematic view showing the various components of a prior art Proton Exchange Membrane (PEM) fuel cell.

It is to be understood that both the foregoing general description and the following detailed description are exemplary and explanatory only and are not restrictive of the invention, as claimed.

Reference will now be made to certain embodiments consistent with the present disclosure, examples of which are illustrated in the accompanying drawings. Wherever possible, the same reference numbers are used throughout the drawings to refer to the same or like parts. Although described in relation to a Proton Exchange Membrane (PEM) fuel cell employing hydrogen, oxygen, and water, it is understood that the devices and methods of the present disclosure can be employed with various types of electrochemical cells, including those operating under high differential pressures. As used herein, the terms "PEM" and "electrolyte membrane" are used interchangeably to refer to the Proton Exchange Membrane.

The present disclosure is directed towards the fabrication of three-dimensional, porous substrates for use as flow field plates and GDLs of high-differential pressure electrochemical cells. In an illustrative embodiment of the present disclosure, the flow field plates and gas diffusion layers are fabricated using metal foams or other porous metallic substrates. In one such embodiment, reactant gases on each side of the PEM flow along the flow field plates and diffuse through the porous GDLs to reach the PEM. In an alternative embodiment, the porous metallic flow field plates can also perform the functions typically required of the GDL, thereby introducing the possibility of eliminating the GDL from the electrochemical cell assembly. In another alternative embodiment, a porous metallic substrate consisting of two distinct layers having different average pore sizes (larger pores constituting the flow field plate, and smaller pores replacing the GDL) can be placed in contact with the PEM. Accordingly, the flow field plates and GDLs are collectively referred to as "flow structure" hereinafter, unless specified otherwise. It is, however, within the scope of the present disclosure to fabricate porous metallic flow field plates for use with conventional GDLs, or to fabricate porous metallic GDLs for use in combination with conventional channel-type flow field plates.

A first aspect of the present disclosure is a method of fabricating flow structures from a porous metallic material for use in an electrochemical cell. In one illustrative embodiment, an open, cellular flow structure can be formed by compacting a highly porous metallic material, such as, a foam, sintered metal frit, or any other porous metal. The porous metallic material can comprise a metal, such as, stainless steel, titanium, aluminum, nickel, iron, etc., or a metal alloy, such as, nickel chrome alloy, etc. In some illustrative embodiments, the size of the pores in the metallic material can range from about 10 to about 1000 μm. For example, the pore size of the metallic material can range from about 20 μm to about 1000 μm, such as from about 50 μm to about 1000 μm, from about 20 μm to about 900 μm, etc, from about 30 μm to about 800 μm, from about 40 μm to about 700 μm, from about 50 μm to about 600 μm, from about 60 μm to about 500 μm, from about 70 μm to about 500 μm, from about 100 μm to about 450 μm, from about 200 μm to about 450 μm, and from about 350 μm to about 450 μm. In illustrative embodiments, the average pore size of the metallic material is about 400 μm, about 500 μm, or about 800 μm. In further embodiments, the void volume of the metallic material ranges from about 70% to about 99%. For example, the void volume of the metallic material can range from about 70% to about 98%, such as from about 75% to about 98%, from about 75% to about 95%, from about 75% to about 90%, from about 75% to about 85%, from about 70% to about 80%, from about 73% to about 77%, from about 80% to about 90%, from about 83% to about 87%, from about 90% to about 99%, and from about 93% to about 97%. In illustrative embodiments, the void volume of the metallic material can be about 75%, about 85%, or about 95%.

In one such embodiment, a metallic material having about 95% void volume and average pore size of about 400 μm is used as the starting material. The porous metallic material can then be compacted by using one or more mechanical techniques (e.g., pressing, rolling, coining, forging, etc.)

Figure 2A:
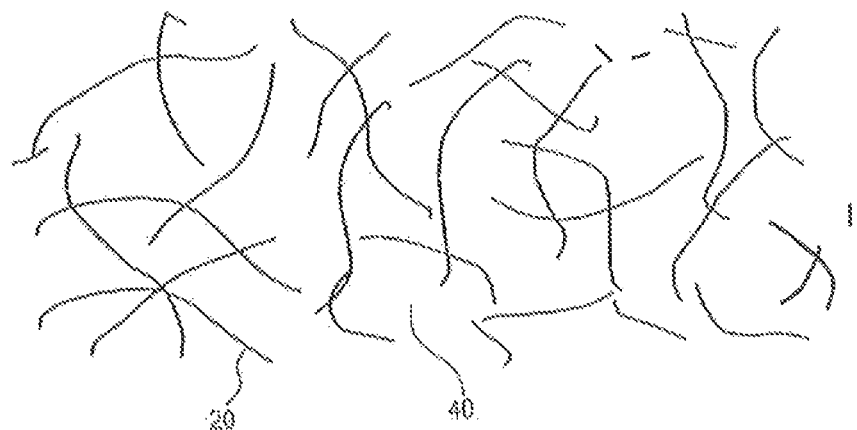
FIG. 2A illustrates a porous metallic material before compaction, in accordance with exemplary embodiments of the present disclosure.
Figure 2B:
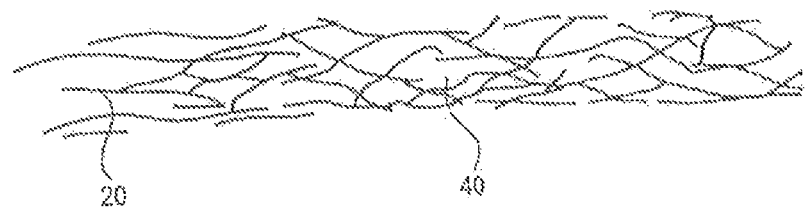
FIG. 2B illustrates a porous metallic material after compaction, in accordance with exemplary embodiments of the present disclosure.

FIGS. 2A and 2B illustrate a porous metallic material before and after the compaction process. As shown in FIG. 2A, ligaments 20 and voids 40 between ligaments 20 create a generally three-dimensional structure in the porous metallic material before compaction. After the compaction process, ligaments 20 form a substantially two-dimensional network, while voids 40 remain connected in three-dimension, as illustrated in FIG. 2B. In exemplary embodiments, the compaction process can cause plastic deformation of ligaments 20 increasing the yield strength of the material (also known as strain hardening or cold working). In some embodiments, ligaments 20 may fold and touch each other during the compaction process which can further increase the effective strength of the matrix. Thus, the compaction process can increase the strength of the porous metallic material. For instance, in one embodiment, the yield strength of the porous metallic material before compaction is 30 psi and after compaction the strength increases to 14,000 psi. Since voids 40 remain connected in three-dimension following the compaction process, the compacted porous metallic structure can maintain sufficient porosity to allow passage of fluids therethrough.

In exemplary embodiments, a porous metallic material intended to form one of the flow structures of an electrochemical cells is compacted to an exposed axial stress level ("$P_{exposed}$") equal to or greater than the intended operational pressure ("$P_{operation}$") of the electrochemical cell. For example, if an electrochemical cell is intended to be operated at a differential pressure of about 4,000 psi, then a porous metallic material forming one of the flow structures in the cell is compacted to a stress level equal to or greater than about 4,000 psi. In exemplary embodiments of high differential pressure electrochemical cells, the low pressure flow structure (i.e., the flow structure on the anode side of the cell) is compacted to a density level greater than that of the high pressure flow structure (i.e., the flow structure on the cathode side of the cell). In some embodiments, the ratio of the exposure stress and the operational pressure ($P_{exposed}/P_{operation}$) ranges from a value of about 1 to about 1.5.

Figure 3:
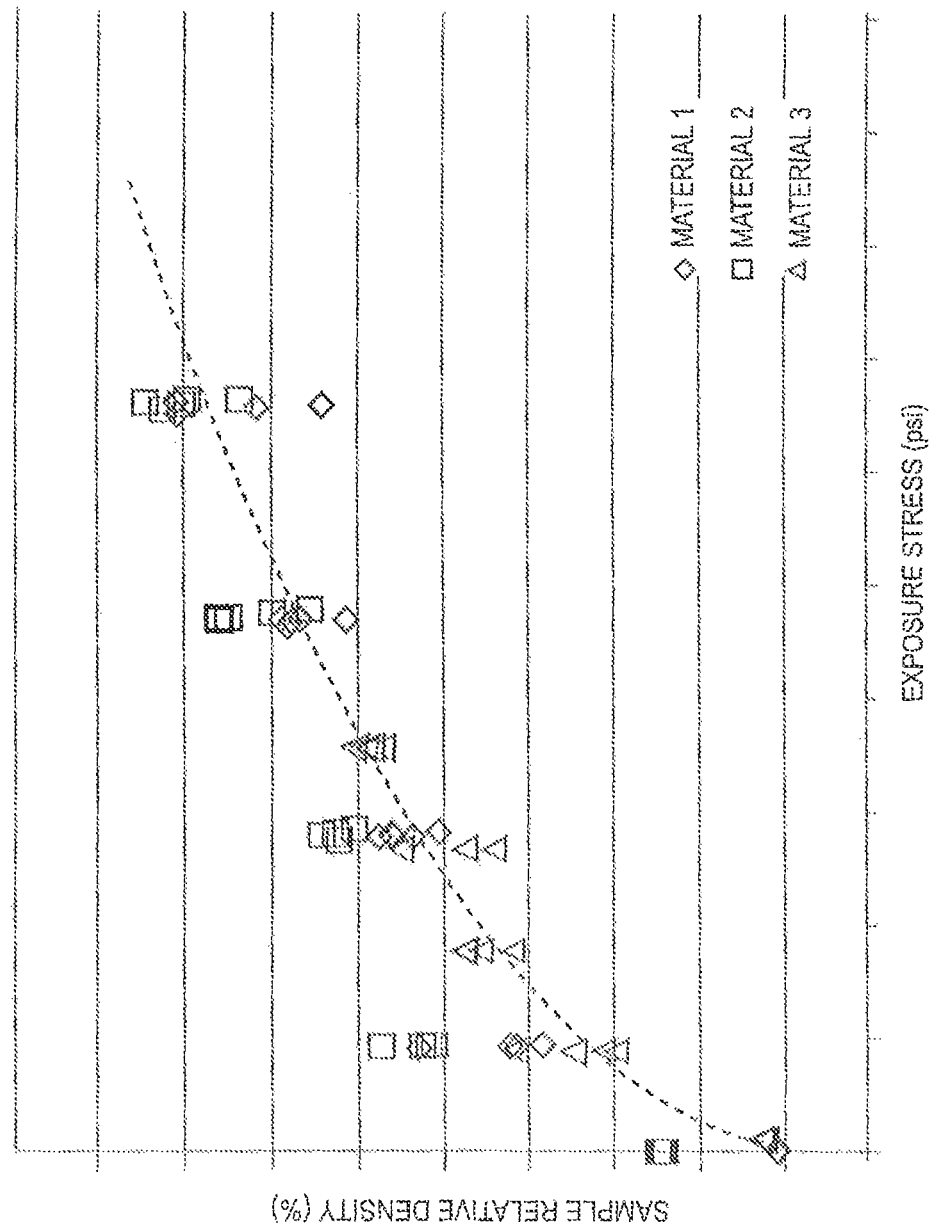
FIG. 3 illustrates the relative densities of three different porous metallic materials as a function of the exposure stress, in accordance with exemplary embodiments of the present disclosure.

FIG. 3 shows the relative densities of three different porous materials as a function of exposure stress, with exposure stress ranging from about 0 to about 20,000 psi and relative density ranging from about 5% to about 45% (void volume, defined as 1-relative density, ranging from about 55% to about 95%). For instance, in one illustrative embodiment, the relative density of the porous metallic material is about 35% at about 14,000 psi exposure stress. As shown in FIG. 3, the density of the porous metallic material can increase with the exposure stress. By adjusting the exposure stress, the size, shape, and distribution of pores in the flow structure (i.e., the resultant density of the flow structure) can be tailored to provide the mechanical strength necessary for high differential pressure electrochemical operations. In one embodiment, for example, compaction can provide mechanical strength greater than about 12,000 psi while maintaining about 55% void volume (relative density about 45%) in the resulting matrix.

Figure 4:
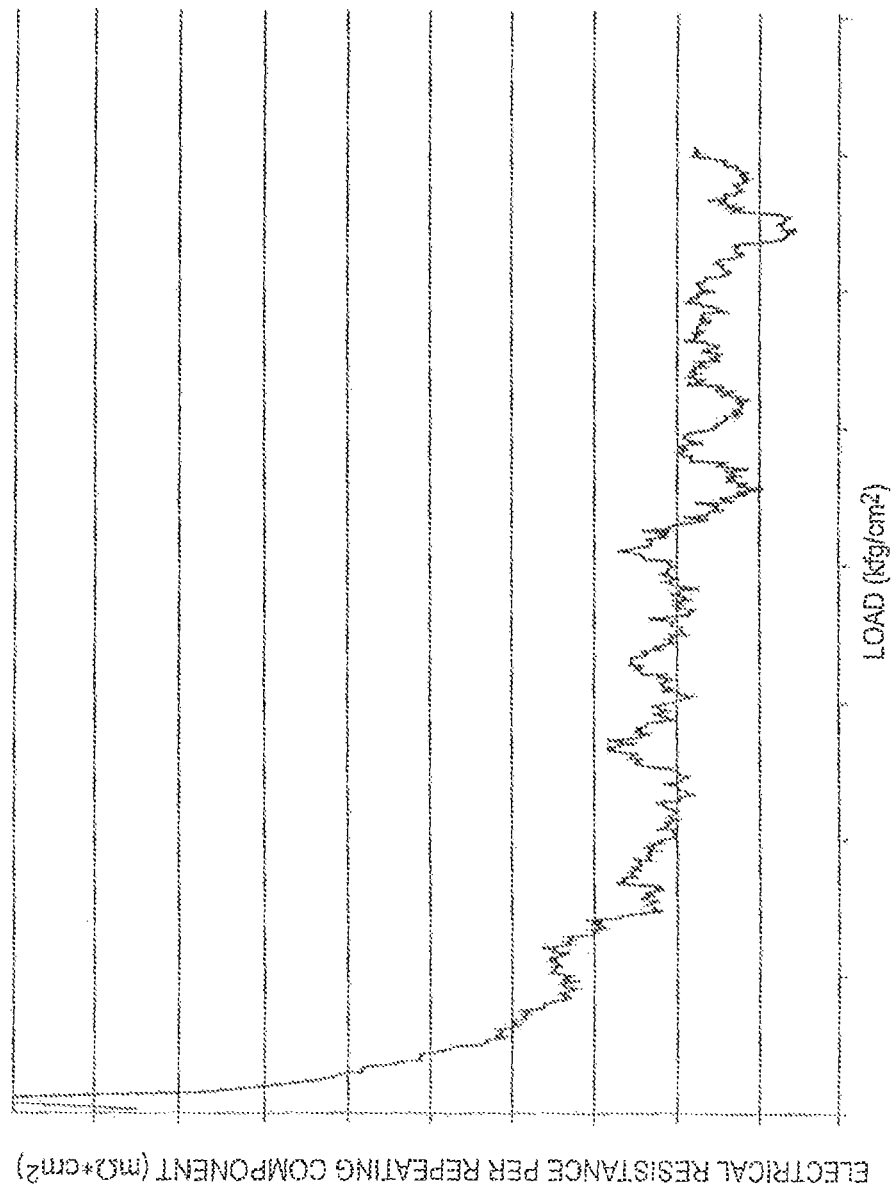
FIG. 4 illustrates the measured contact resistance at the flow structure-electrolyte membrane interface as a function of contact pressure, in accordance with exemplary embodiments of the present disclosure.

In some embodiments, the compacted porous metallic flow structure can offer low electrical contact resistance at the interface between the electrolyte membrane and the flow structure. Contact resistance is generally dependent on the contact pressure between two interacting surfaces, with contact resistance decreasing as the contact pressure increases. FIG. 4 shows the electrical contact resistance of an exemplary compacted metallic matrix as a function of contact pressure, with contact pressure ranging from about 1 to about 300 kgf/cm$^2$ and contact resistance ranging from about 2 to 100 mΩ-cm$^2$. As the contact pressure increases, the contact resistance at the flow structure-PEM interface can decrease, as illustrated in FIG. 4. In one embodiment, the contact resistance of a compacted metallic matrix can be low (for example, less than about 50 mΩ-cm$^2$) even at low contact pressures. The contact resistance can decrease further if contact pressure is increased.

Contact resistance at an interface is also governed by the surface topography of the contacting pair. Roughness features at the contacting surfaces can decrease the actual area in contact and current flows only through the contact asperities, which can lead to a voltage drop across the interface. In exemplary embodiments of the present disclosure, the compacting process is designed to provide porous metallic flow structures having at least one flat and smooth surface. For example, in one embodiment, the measured surface roughness (Ra) can be less than about 32 μin. In other embodiments, the machining tool used for compacting is selected and configured to achieve a surface roughness of less than about 20 μin, about 10 μin, or about 5 μin. The surface flatness of the compacted metallic matrix can also be measured to ensure optimal contact resistance at the interface. In exemplary embodiments, the flatness measured can be less than about 0.002 inches. In other embodiments, the flatness can be less than about 0.001 inches, or less than about 0.0005 inches. The high degree of flatness and low surface roughness of the compacted porous metallic flow structures can provide optimal contact resistance between the interacting cell components.

In another aspect of the present disclosure, the compacted porous metallic matrix can be laminated on one side with a micro-porous material layer (MPL) to form the flow structure. For example, the porous metallic matrix can be laminated with the MPL before the compaction process, or the porous metallic matrix can be laminated with the MPL after the compaction process. Lamination can include calendering, pressing, or coating the MPL onto the porous material. The flat, smooth laminated surface can be placed adjacent to the electrolyte membrane of an electrochemical cell.

In exemplary embodiments, the pore size of the MPL ranges from about 0.1 to 50 μm. For example, the average pore size of the MPL can range from about 0.1 μm to about 40 μm, such as from about 0.5 μm to about 20 μm, from about 0.5-10 μm, from about 1 μm to about 10 μm, etc. In illustrative embodiments, the average pore size of the laminated MPL is less than the average pore size of the compacted layer, which can create a porosity gradient through the metallic flow structure and facilitate the distribution of mechanical support to the electrolyte membrane. For example, the ratio of the average pore sizes of the MPL and the compacted porous matrix ($pore_{MPL}/pore_{compacted\_matrix}$) can be less than about 0.5. In another embodiment, $pore_{MPL}/$ pore$_{compacted\_matrix}$) can be less than about 0.4, less than about 0.3, less than about 0.2, less than about 0.1, or less than about 0.05.

In exemplary embodiments, a porosity gradient can be created by laminating a plurality of MPLs, each with an average pore size smaller than that of the immediately preceding layer. The pore size gradient achieved by laminating a compacted porous matrix with multiple MPLs is illustrated by the schematics in FIG. 5A (before compaction) and FIG. 5B (after compaction and lamination). The gradient in pore size may be desirable for electrochemical cells operating under high differential pressures, because it helps in effectively redistributing mechanical load along the flow structure, while simultaneously maintaining finely-pitched contact with the membrane, providing optimal porosity for gas diffusion, and preventing the PEM from "ballooning" into the porous flow structure.

In exemplary embodiments, the MPL can be coated with an electrocatalyst layer if the electrocatalyst is not integral to the membrane electrode assembly. The resulting laminated structure can be arranged in the electrochemical cell with the electrocatalyst layer positioned in contact with the PEM.

Figure 6A:
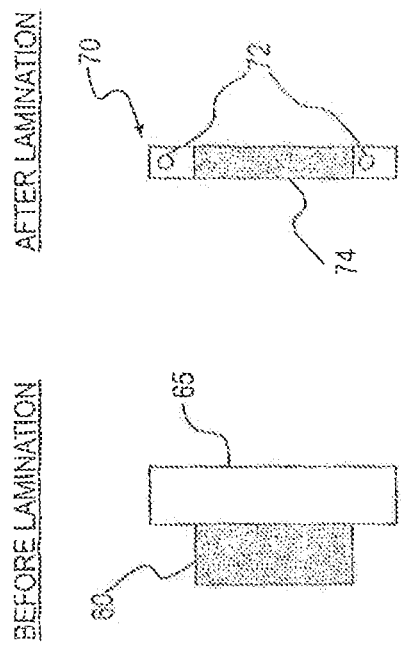
FIG. 6A illustrates a method of forming a compacted porous metallic matrix having variable porosity, in accordance with exemplary embodiments of the present disclosure.

In illustrative embodiments, variable porosity within a single compacted porous metallic matrix can be achieved by laminating two or more metallic matrices having different sizes. In one such embodiment, the initial porosities of the two or more porous metallic matrices forming the final compacted matrix are the same. In another embodiment, the initial porosities of the two or more porous metallic matrices are different from each other. FIG. 6A illustrates how two porous metallic matrices 60, 65 having different sizes can be laminated together to form a single compacted porous metallic matrix 70 having variable porosity. In one such embodiment, resulting matrix 70 comprises two separate regions 72, 74 having different relative densities-a low density region 72 and a high density region 74. Low density region 72 has higher porosity and offers lesser flow resistance than high density region 74. Also, in some embodiments, low density region 72 has a lower yield strength that high density region 74.

Figure 6D:
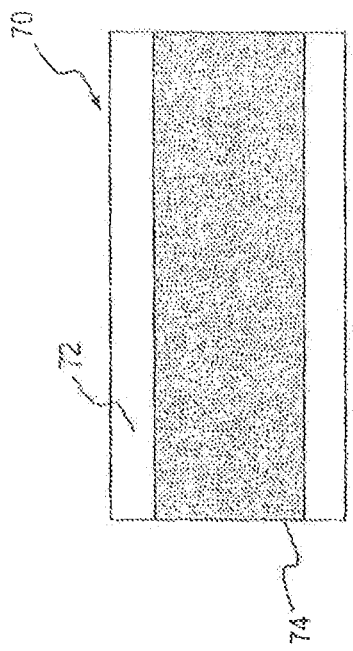
FIGS. 6B-6D illustrate various configurations of compacted porous metallic matrices having variable porosity, in accordance with exemplary embodiments of the present disclosure.
Figure 6B:
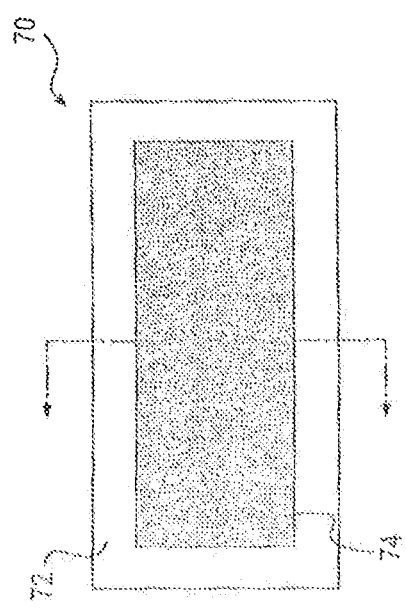
Figure 6C:
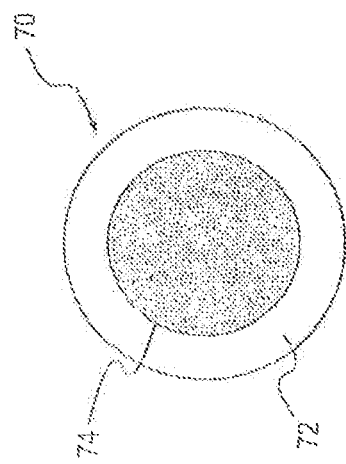

FIGS. 6B-6D show various embodiments of variable-porosity compacted porous metallic matrices. FIGS. 6B and 6C illustrate a rectangular framed compacted matrix 70 and a circular framed compacted matrix 70, respectively, wherein high density region 74 is surrounded on all sides by low density region 72. FIG. 6D illustrates a rectangular strip compacted matrix 70, wherein the entire central region of the matrix comprises high density region 74 which is flanked on the top and bottom by low density regions 72.

Figure 7:
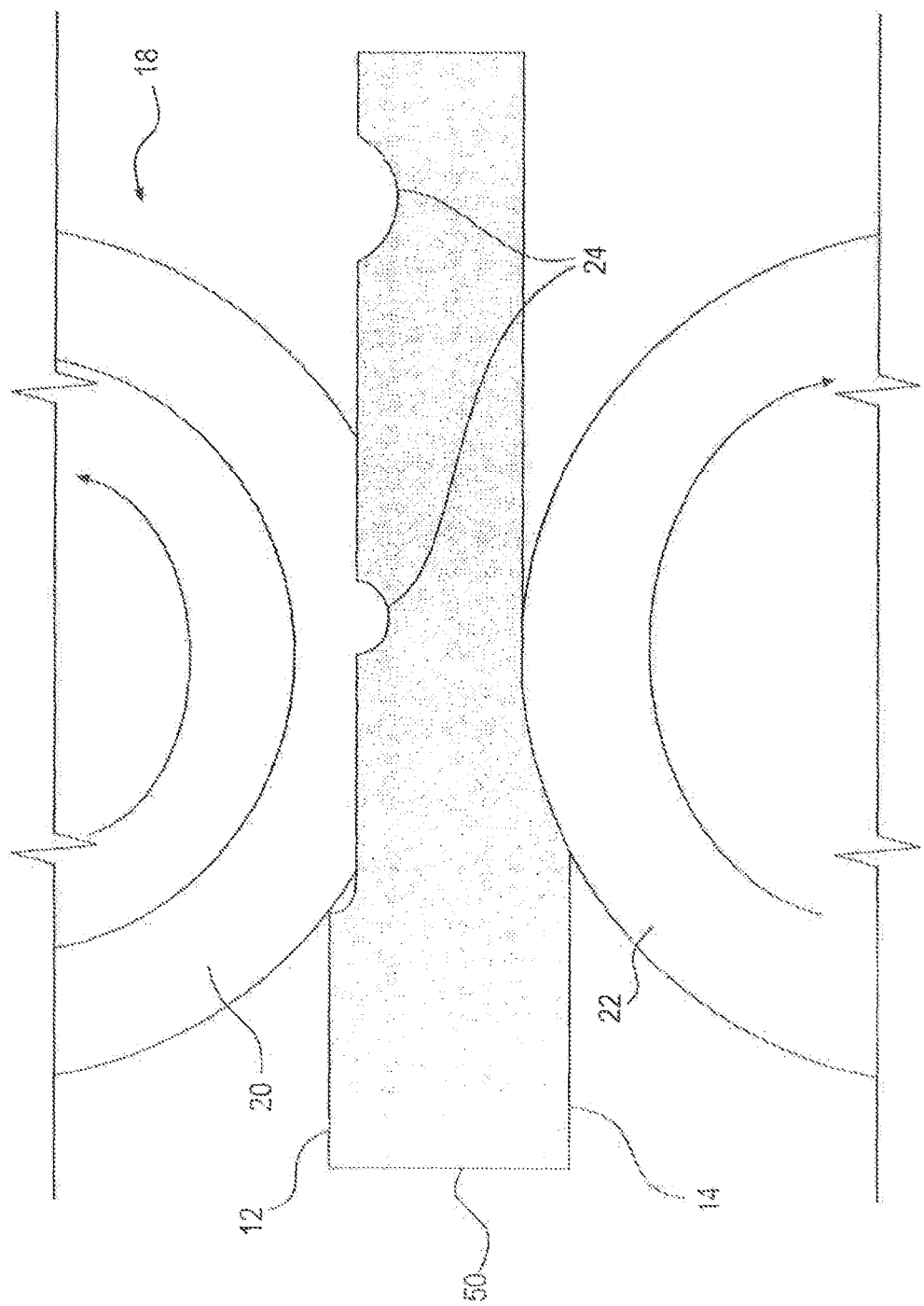
FIG. 7 illustrates another method of forming compacted porous metallic matrices having variable porosity, in accordance with exemplary embodiments of the present disclosure.

In some embodiments, a porous metallic material intended to form one of the flow structures of an electrochemical cells may have defects, such as, missing ligaments, large pore sizes, low metal loading, etc., resulting in areas of low density that are likely to have lower yield strength and elastic modulus than surrounding areas of the porous metallic material. Flow structures formed with porous metallic materials having low density areas may not be able to adequately support the electrolyte membrane when a high differential pressure exists in the electrochemical cell and may cause membrane extrusion or rupture. To avoid formation of weak areas in the flow structure, the low density areas of the porous metallic material are collapsed to a greater extent, resulting in a compacted porous metallic matrix having non-uniform thickness. In exemplary embodiments, as shown in FIG. 7, the compaction process may include collapsing the low density areas in a porous metallic material 50 with one or more compression devices 18. The relative density of the metallic material may range from about 5% to about 45% before compaction. Examples of the relative density range include, for example, from about 10% to about 40%, from about 10% to about 35%, from about 10% to about 30%, from about 10% to about 25%, from about 10% to about 20%, from about 15% to about 40%, from about 15% to about 35%, from about 15% to about 30%, from about 15% to about 25%, from about 20% to about 40%, from about 20% to about 35%, from about 20% to about 30%, from about 25% to about 40%, and from about 25% to about 35%.

As described in more detail hereinafter, the one or more compression devices 18 may provide a generally uniform pressure to porous metallic material 50. This may cause the low density areas in porous metallic material 50 to be collapsed to a greater extent, resulting in a compacted porous metallic matrix having a non-uniform thickness. A porous, conductive filler material may be applied to a surface of the compacted porous metallic material to fill in the collapsed areas, and thereby, the compacted porous metallic matrix may have smooth surface, generally uniform thickness, and approximately uniform yield strength and elastic modulus. Porous metallic material 50 may have mechanical strength greater than about 12,000 psi and an elastic modulus of about 500,000 psi after compaction.

The one or more compression devices 18 may include, for example, any device suitable to compact or compress porous metallic material 50. For example, the one or more compression device 18 may comprise one or more rollers, one or more bricks or plates, one or more bladders, or one or more materials configured to apply high pressure. The one or more compression devices 18 may include devices having similar or different compliances. Suitable methods for compressing porous metallic material 50 with the one or more compression devices may include, for example, stamping, calendering, or hydroforming.

In some embodiments, the one or more compression devices 18 may include a first roller 20 and a second roller 22. One or more rollers 20, 22 may apply pressure to porous metallic material 50 through a calendaring process. For example, as shown in FIG. 7, first roller 20 may contact a first surface 12 of porous metallic material 50 and second roller 22 may contact a second surface 14 of porous metallic material 50, wherein the second surface 14 is opposite the first surface 12. The first and second rollers 20, 22 may contact porous metallic material 50 substantially simultaneously, such that porous metallic material 50 is compressed between the first and second rollers 20, 22. As shown in FIG. 7, first roller 20 may rotate along porous metallic material 50 in a direction opposite the rotation of second roller 22. However, it is further contemplated that first and second rollers 20, 22 may rotate along porous metallic material 50 in the same direction. First roller 20 and second roller 22 may contact porous metallic material 50 at the same speed or at different speeds.

In select embodiments, first roller 20 may include a soft or compliant roller, and second roller 22 may include a hard or unpliable material. For example, first roller 20 may include high durometer polymers such as, for example, polyurethane, polyethylene and rubbers. In some embodiments, first roller 20 may include a soft or compliant outer covering, for example, a felt or elastomeric material including polyurethane or rubber. Second roller 22 may include, for example, carbon paper, carbon cloth, and elastomeric materials. In another embodiment, first and second rollers 20, 22 may both include a hardened material. The hardened material may include materials having high hardness values, or materials treated to create a hardened surface.

In some embodiments, first and second rollers 20, 22 may include hard or unpliable flat plates, rather than cylindrical rollers. Porous metallic material 50 may be compressed between the plates. In other embodiments, first and second rollers 20, 22 may include hydroforming bladders.

In other embodiments, first and second rollers 20, 22 may apply pressure to porous metallic material 50 through a hydroforming process. For example, first roller 20 may include high pressure fluid injected into a mold, and second roller 22 may include a negative mold. The hydraulic fluid may be pressurized to greater than the desired yield strength of the metallic material, for example, greater than about 12,000 psi. In some embodiments, the high pressure fluid may be injected into a bladder rather than a mold. Porous metallic material 50 may be compressed between the pressure of first roller 20 and second roller 22. For example, porous metallic material 50 may be pressed to a pressure greater than the desired yield strength of the metallic material, for example, greater than about 12,000 psi. After compression by the one or more compression devices 18, porous metallic material 50 may include a relative density of 35%. A surface roughness of the compacted porous metallic material 50 may range from about 20 μin to about 5 μin. In some embodiments, porous metallic material 50 may include surfaces with varying roughness after compression by compression devices 18. For example, after compression, first surface 12 may include a smoother surface than second surface 14. Furthermore, porous metallic material 50 may include a yield strength of approximately 12,000 psi and an elastic modulus of approximately 500,000 psi after compression.

Figure 8:
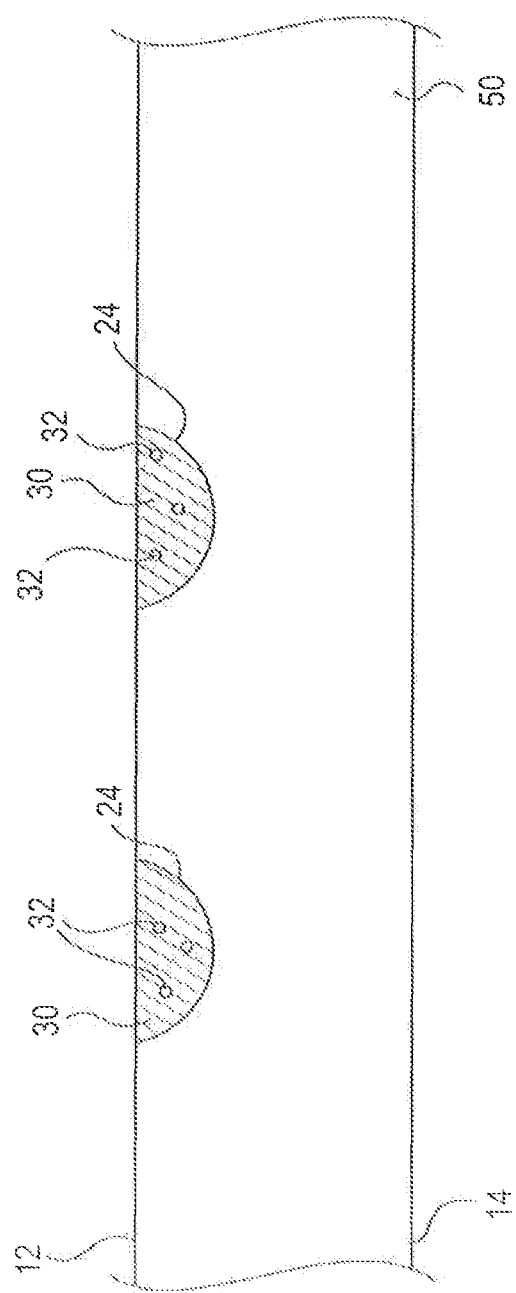
FIG. 8 illustrates a schematic view showing a porous metallic material in accordance with exemplary embodiments of the present disclosure.

First and second rollers 20, 22 may provide a uniform pressure to porous metallic material 50 sufficient to collapse the low density areas within the porous metallic material. In some embodiments, the uniform pressure may provide porous metallic material 50 with a varied or uneven our surface. For example, the low density areas may collapse more than the higher density areas of porous metallic material 50, such that the low density areas may form surface features 24 on an outer surface of porous metallic material 50. As shown in FIG. 8, surface features 24 may include natural random deviations in the outer surface layer, collapsed pockets, grooves, or indentations.

Figure 9:
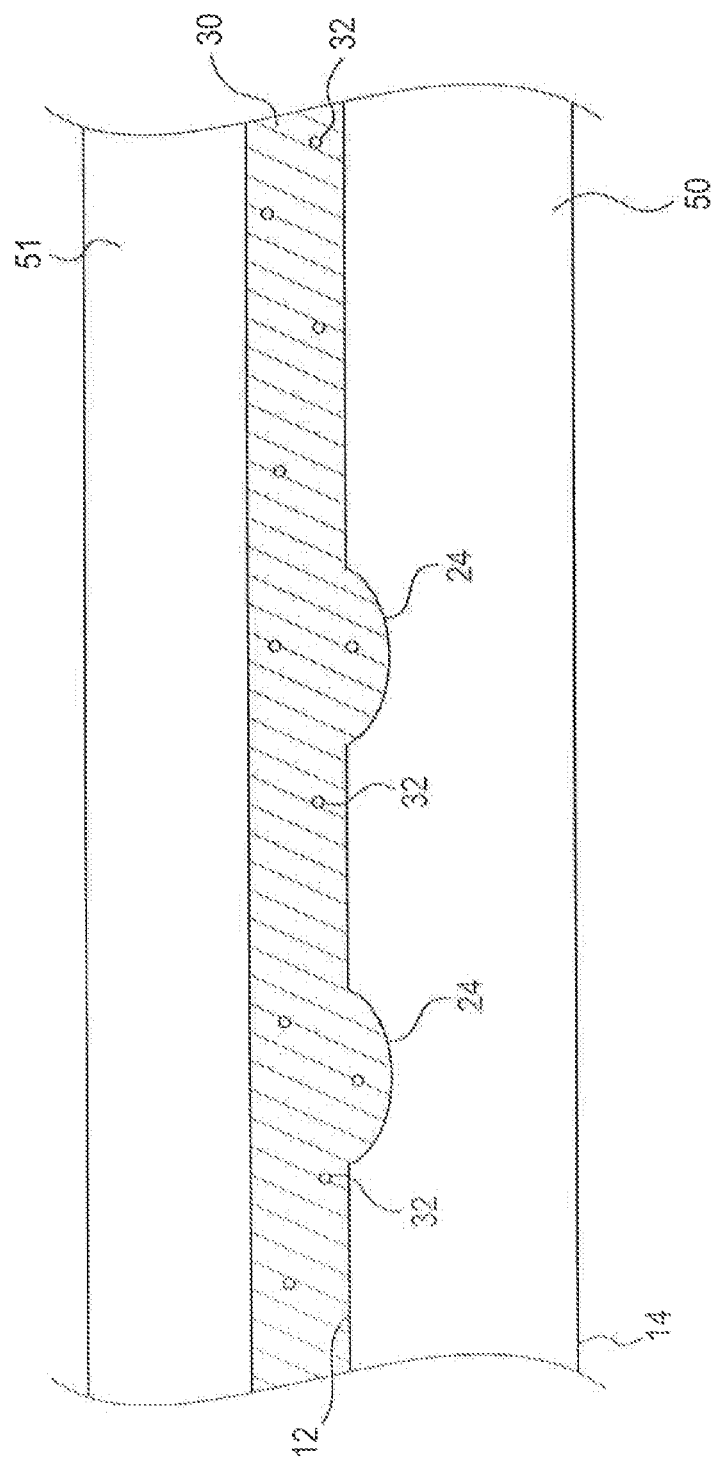
FIG. 9 illustrates another schematic view showing a porous metallic material in accordance with exemplary embodiments of the present disclosure.

One or more fillers 30 may be applied to the compacted porous metallic material to provide a substantially uniform outer surface. As shown in FIG. 8, filler 30 may fill in surface features 24 and form a substantially smooth and flat outer surface. A smooth and flat outer surface may have a surface flatness of less than about 0.0005 inches. In some embodiments, as shown in FIG. 9, filler 30 may form a substantially smooth outer covering for the compacted porous metallic material. The covering may be about 0.010 inches to about 0.001 inches in thickness. It is further contemplated that the thickness may be dependent on how deeply porous metallic material 50 is deformed in the compression process.

Filler 30 may be laminated onto surfaces of porous metallic material 50 after the compaction process. Lamination may include calendering, pressing, or coating the porous metallic material onto porous metallic material 50.

Filler 30 may be porous and of a material sufficient to withstand compression devices 18 and not be pushed into porous metallic material 50 by first and second roller 20, 22. Such materials may include conductive materials such as graphite epoxy, carbon black, carbon fibers, graphite beads, or glass beads. Filler 30 may also function as the MPL. In some embodiments, filler 30 may include a binder 32, such as graphite epoxy, non-conductive epoxy, NAFION®, TEFLON®, or graphite epoxy. Binders 32 may increase the strength of the filler material. Binder 32 may be present in filler 30 form about 100 v/v % to about 5 v/v %. In one embodiment, filler 30 includes a mixture of carbon black and NAFION®. In another embodiment, filler 30 includes a mixture of carbon black and TEFLON®. In yet another embodiment, both filler 30 and binder 32 include graphite epoxy.

Additionally, filler 30 may include one or more additives, including pore formers, fibers, and powders. The additives may be present from about 95 v/v % to about 0 v/v %. The pore formers may include glycerol, PEG (polyethylene glycol), or PVP (polyvinylpyrrolidone). The pore formers may be baked off or dissolved from the porous metallic material. The open pore structure created by the pore formers allows passage of water and gas to and from the electrodes 7A, 7C.

In some embodiments, as shown in FIG. 9, filler 30 may be configured to bond porous metallic material 50 with a bipolar plate 51 to form a complete flow structure. For example, binder 32 in filler 30 may bond porous metallic material 50 with bipolar plate 51 placed against porous metallic material 50.

It is further contemplated that the process of the present disclosure may include repeated compression with the one or more compression devices 18. For example, porous metallic material 50 may be re-compressed with first and second rollers 20, 22 after application of the filler. A second filler may then applied to porous metallic material 50, wherein the second filler may be the same or different from the original filler.

A resulting flow structure produced by the disclosed method may include a uniform thickness of approximately 0.25 mm to about 1 mm. Additionally, the flow structure may comprise a substantially uniform yield strength ranging from about 12,000 psi to about 15,000 psi. An elastic modulus of the flow structure may range from about 100,000 to about 500,000.

EXAMPLE

Use of Porous Metallic Matrices as Flow Structures in Electrochemical Hydrogen Compression The fabrication process described herein was used to fabricate the flow structures of a PEM electrochemical cell used for hydrogen compression. Specifically, the flow structures (one on each side of the PEM) were fabricated by compacting highly porous metallic matrices to increase the yield strength of the material. The average pore size of the porous metallic matrices before compaction was about 400 μm. After compaction, the average pore size of the metallic matrices was on the order of 50-100 μm. At least one surface of each of the compacted porous metallic matrices were then laminated with micro-porous material layers (MPLs) having pore size on the order of about 0.5 μm to 10 μm to create porosity gradient through the flow structures. The flow structures were positioned in the electrochemical cell with the laminated surfaces in contact with the PEM. A 50 μm PFSA (perflurosulfonic acid) membrane was used as the PEM of the electrochemical cell.

Figure 10:
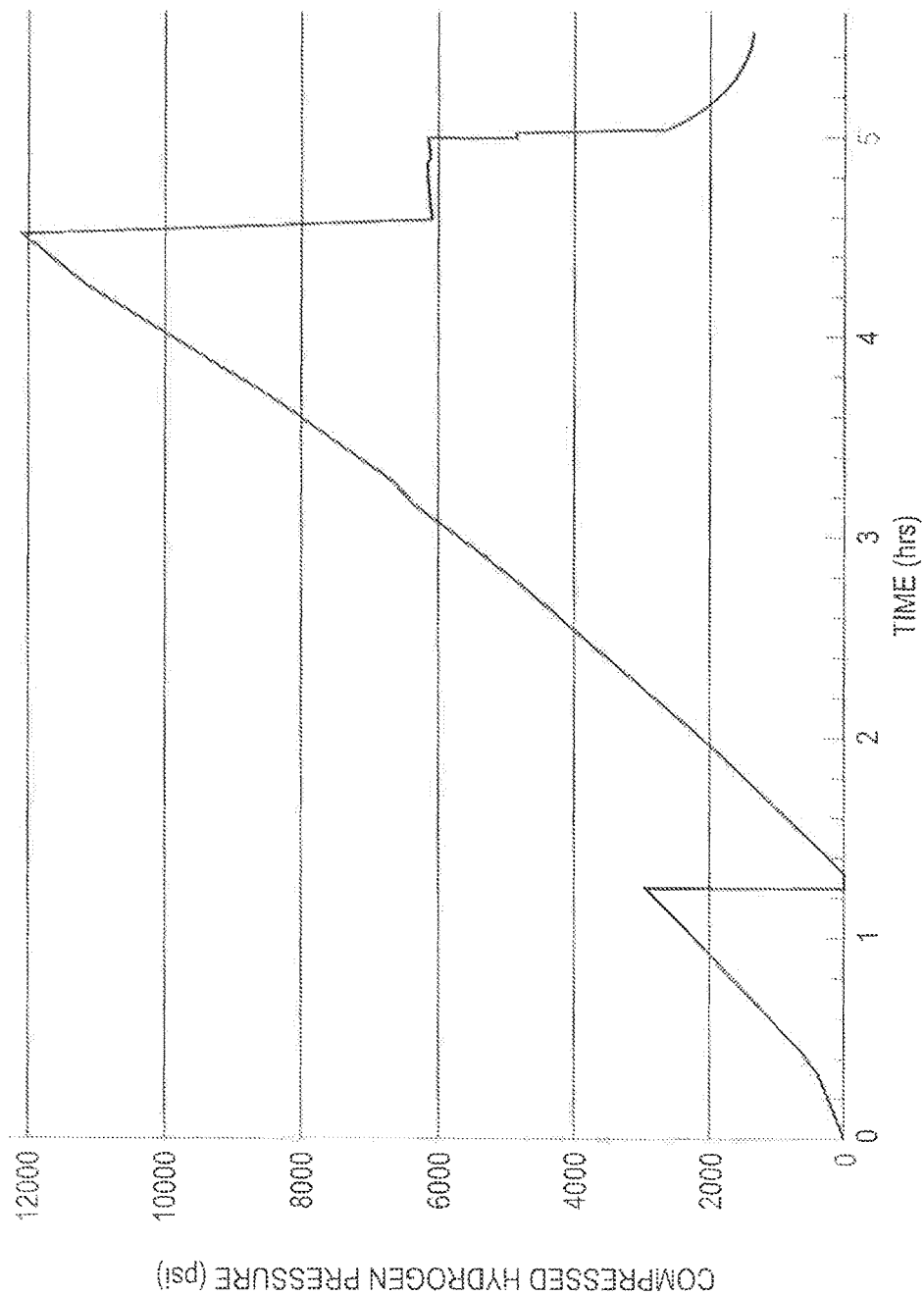
FIG. 10 illustrates the variation of compressed pressure as a function of time for a two-cell electrochemical hydrogen compression stack, in accordance with exemplary embodiments of the present disclosure.

FIG. 10 illustrates the range of differential pressure experienced by the electrochemical hydrogen compression cell, with differential pressure being measured as the difference between the inlet hydrogen pressure and the compressed hydrogen pressure. The inlet hydrogen pressure ranged from about 0 to about 25 psi and the compressed pressure ranged from about 0 to about 12,000 psi. That is, the electrochemical cell was able to operate at differential pressures greater than about 12,000 psi without rupturing the membrane.

The present disclosure provides flow field plates having sufficient and uniform strength to adequately support and maintain contact with a MEA, and thereby prevent rupture or extrusion of an electrolyte membrane. The flow field plates may compensate for low density areas while providing a smooth and flat outer surface. This may increase the efficiency of an electrochemical cell and prevent damage under a high gas pressure differential. Additionally, the flow field plates of the present disclosure may provide more uniform electrical contact between the low pressure flow field and electrode, and thereby improve the efficiency of the electrochemical cell.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flow structure for use in an electrochemical cell, comprising:
    a compacted porous metallic substrate having a void volume greater than about 55% and yield strength greater than about 12,000 psi, wherein the compacted porous metallic substrate is formed by:
        selecting a porous metallic substrate with a void volume between about 75% and about 98%; and
        compacting uniformly the porous metallic substrate causing plastic deformation and thereby forming the compacted porous metallic substrate and increasing the yield strength to greater than about 12,000 psi;
    at least one micro-porous material layer laminated on one side of the compacted porous metallic substrate, wherein an average pore size of the at least one micro-porous material layer is smaller than an average pore size of the compacted porous metallic substrate.

2. The flow structure of claim 1, wherein a porosity gradient is formed through the flow structure by laminating a plurality of micro-porous material layers on the compacted porous metallic substrate, each micro-porous material layer having a pore size smaller than an immediately preceding layer.

3. The flow structure of claim 1, wherein pore size of the at least one micro-porous material layer ranges from about 0.5 μm to about 10 μm.

4. The flow structure of claim 1, wherein the compacted porous metallic substrate comprises a high density region and a low density region, wherein the high density region has lower porosity that the low density region.

5. The flow structure of claim 4, wherein the high density region has a higher yield strength than the low density region.

6. The flow structure of claim 1, further comprising one or more fillers laminated to a surface of the compacted porous metallic substrate after compaction, wherein the fillers make the surface substantially smooth and uniform.

7. The flow structure of claim 6, wherein the surface has a surface flatness of less than about 0.0005 inches.

8. The flow structure of claim 6, wherein the fillers form a covering on the surface having a thickness between about 0.01 inches to about 0.001 inches.

9. The flow structure of claim 6, wherein the fillers are formed of at least one of graphite epoxy, carbon black, carbon fibers, graphite beads, or glass beads.

10. The flow structure of claim 6, wherein the fillers include a binder configured to increase the strength of the fillers.

11. The flow structure of claim 10, wherein the fillers include additives and the additives include at least one of pore formers, fibers, or powders.

12. An electrochemical cell for use in high differential pressure operations, comprising:
    a first electrode, a second electrode, and a proton exchange membrane disposed therebetween;
    a first flow structure in fluid and electrical communication with the first electrode, comprising:
    a first compacted porous metallic substrate having a void volume greater than about 55% and yield strength greater than about 12,000 psi, wherein the first compacted porous metallic substrate is formed by:
    selecting a porous metallic substrate with a void volume between about 75% and about 98%; and
    compacting uniformly the porous metallic substrate causing plastic deformation and thereby forming the first compacted porous metallic substrate and increasing the yield strength to greater than about 12,000 psi;
    at least one micro-porous material layer laminated on one side of the compacted porous metallic substrate, wherein an average pore size of the at least one micro-porous material layer is smaller than an average pore size of the compacted porous metallic substrate; and
    a second flow structure comprising a second porous metallic substrate, wherein the second flow structure is in fluid and electrical communication with the second electrode.

13. The electrochemical cell of claim 12, wherein at least one of the first and the second flow structures comprise a porosity gradient along the flow structure.

14. The electrochemical cell of claim 12, wherein the first flow structure is compacted to a density level greater than that of the second flow structure.

* * * * *